United States Patent [19]

Ohhazama et al.

[11] Patent Number: 4,758,039
[45] Date of Patent: Jul. 19, 1988

[54] MOLDING HOLDER FOR A VEHICLE WINDOW

[75] Inventors: Tsuneyoshi Ohhazama, Yokosuka; Masakazu Miyoshi, Yokohama, both of Japan

[73] Assignee: Kato Hatsujo Kaisha, Ltd., Kanagawa, Japan

[21] Appl. No.: 337,723

[22] Filed: Jan. 7, 1982

[51] Int. Cl.4 .................................................. B60J 1/02
[52] U.S. Cl. .................................................. 296/84 A
[58] Field of Search .................. 296/201, 84 R, 84 A, 296/84 D; 280/770; 293/126, 127, 128; 52/717, 718, 717.1, 718.1

[56] References Cited

U.S. PATENT DOCUMENTS

| 3,634,991 | 1/1972 | Barton | 52/718 |
| 3,738,074 | 6/1973 | Tucker | 52/718 |
| 4,304,075 | 12/1981 | Miyoshi | 52/718 |

Primary Examiner—Andres Kashnikow
Attorney, Agent, or Firm—Foley & Lardner, Schwartz, Jeffery, Schwaab, Mack, Blumenthal & Evans

[57] ABSTRACT

The holder has a rustproof holding body bonded to a body panel of the vehicle, a rustproof press-fitting support engaged within a molding fixedly bonded to the outside of the window, and a holding arm projecting from the support and inserted into a holding gap between the stationary seat of the holding body and a holding part of the seat. Thus, the molding can be fixedly held via the holder to the window of the vehicle inexpensively.

3 Claims, 1 Drawing Sheet

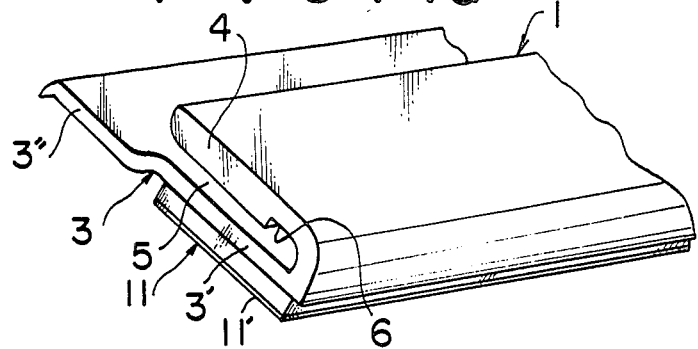
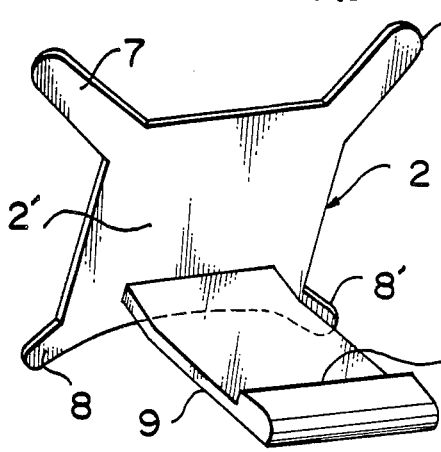
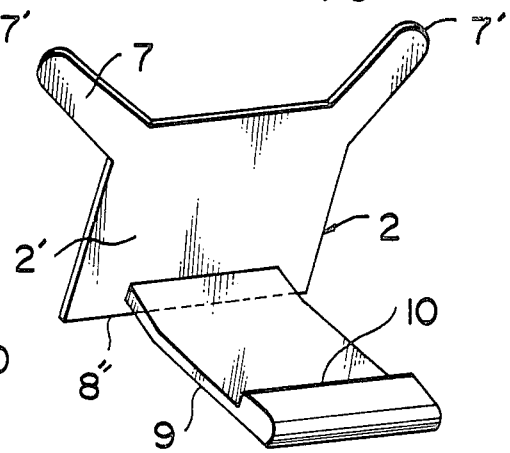
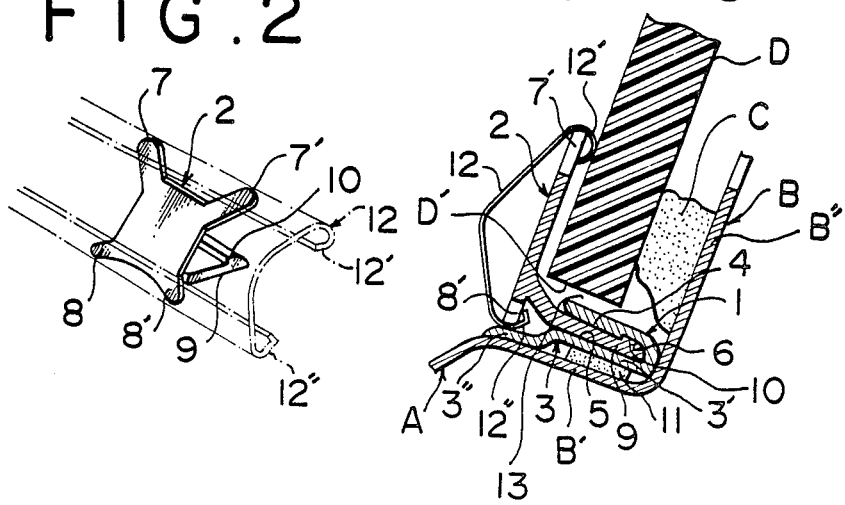

MOLDING HOLDER FOR A VEHICLE WINDOW

BACKGROUND OF THE INVENTION

This invention relates to a holder for fixedly holding a molding decoratively used around the periphery of a window for a vehicle and, more particularly, to a holder for fixedly mounting a molding to a window for the purpose of improving external appearance, waterproofness and dustproofness of the window.

A conventional molding used for a window is held by mounting metallic studs at arbitrary intervals on the surface of a body panel around the periphery of the molding by welding or the like. A holder is mounted at the studs as disclosed, for example, in U.S. Pat. Nos. 3,373,539, 3,410,045 and 3,481,096. The metallic studs or the holder can rust from use for a long time. When the rust of the studs or the holder expands, leaks develop. Further, it takes much time to weld the metallic studs. If the studs are not completely welded considerable irregularities in the size of the studs occur at the time of welding and variations in the projections of the studs welded in the projecting direction result. Consequently, the holder and the molding associated with the metallic studs sometimes become defective. Though the conventional holding structure of molding for eliminating the aforementioned drawbacks is already disclosed in U.S. Pat. No. 3,968,613, in this holding structure, an elongated resilient pad is interposed between the body panel surface forming the peripheral edge of a window frame and the outer peripheral edge of the window, and the end of the fastener for holding the molding is inserted into the pad, thereby pressing the molding onto the outer peripheral surface of the window.

In the above described structure, the pad is bonded to the body panel surface at the peripheral edge of the window frame, and the pad is pressed by the outer peripheral edge of the window onto the body panel surface, i.e., the gap between the outer peripheral edge and the body panel surface is completely sealed by the pad. Accordingly, if the window is, for example, damaged, the molding is rusted or damaged, or the body panel surface is rusted or damaged and they should be repaired by removing the fastener of the molding from the pad, it is very difficult to remove the fastener, because the fastener is inserted into the pad. If the fastener is forcibly removed, it may be destroyed or the body panel will be readily broken.

SUMMARY OF THE INVENTION

Accordingly, a primary object of this invention is to provide a molding holder for a window of a vehicle in which all the aforementioned disadvantages and drawbacks of the conventional molding holder are overcome, and which can readily fixedly hold the molding with the same strength as the metallic studs or an elongate resilient pad.

Another subject of this invention is to provide a molding holder for a window of a vehicle in which the molding can be simply removed by moving the molding holder in a predetermined direction when removing the molding for various repairs. For this purpose, a structure is incorporated for providing a sufficient gap between the outer peripheral edge of the window and the body panel surface so that the molding holder can be moved even after the molding is mounted.

Yet another object of this invention is to provide a molding holder for a window of a vehicle in which defects caused by dust can be eliminated.

A further object of this invention is to provide a molding holder for a window of a vehicle in which the number of mounting steps can be reduced by omitting the step of welding metallic studs.

Still another object of this invention is to provide a molding holder for a window of a vehicle in which the molding can be held on the window inexpensively.

Still another object of this invention is to provide a molding holder for a window of a vehicle which can be mounted efficiently and economically.

Still another object of the invention is to provide a molding holder for a window of a vehicle in which the molding holder can be rigidly secured without welding.

The above and other objects and features of the invention will be apparent from a reading of the following description of the disclosure with reference to the accompanying drawings.

BRIEF DESCRIPTION OF THE DRAWINGS

FIGS. 1(a) through 1(c) are perspective views showing the component members of a preferred embodiment of a molding holder for a window of a vehicle constructed according to the present invention, wherein FIG. 1(a) shows a holding body, and FIGS. 1(b) and 1(c) show various examples of the press-fitting support;

FIG. 2 is an explanatory perspective view of the press-fitting support associated with the molding in FIG. 1(a); and FIG. 3 is a longitudinal side sectional view showing the molding fixedly held by the holder of the present invention at the Front window of the vehicle.

DESCRIPTION OF THE PREFERRED EMBODIMENTS

Reference is made to the drawings, particularly to FIGS. 1(a), 1(b) and 1(c), which show a preferred embodiment of the molding holder constructed according to the present invention with two members forming the molding holder. In FIGS. 1(a), 1(b) and 1(c), the molding holder of the present invention consists of a holding body 1 and a press-fitting support 2.

The holding body 1 is made of thermo-plastic material and has a stationary seat 3 integrally formed in a J shape at one end which is folded back along one side, and a holding part 4 integrally extended in parallel with the seat 3 from the folded end of the seat 3 in such a manner that a holding gap 5 is formed between the seat 3 and the holding part 4.

Further, the stationary seat 3 is formed with a bonding stationary seat 3' at its base end side and a molding fixing seat 3" extending integrally from the bonding seat 3' past the holding part 4. On the inside surface of the holding part 4 confronting the holding gap 5 is formed longitudinally an engaging part 6 such as a recessed cutout groove or the like. The holding body 1 thus constructed is cut in a suitable length for the size of the width or height of a window when it is used to mount the molding at the window by the holder.

As shown in FIG. 1(b), the press-fitting support 2 is made of thermo-plastic material in a rectangular plate body 2' which has two elastic arm pieces 7 and 7' projecting in horn shape obliquely outwardly from both upper corners of the plate body 2', and two pressing leg pieces 8 and 8' which are smaller than the two elastic arm pieces 7 and 7' and project similarly obliquely outwardly downwardly from both lower corners of the plate body 2'. A holding arm 9 projects perpendicularly to the back surface of the plate body 2' from the lower part of the back surface and has a claw-shaped engaging part 10 raised from the upper surface at the end thereof to be engaged with the engaging part 6 of the holding body 1 in parallel with the plate body 2'.

Further, though the holding body 1 shown in FIG. 1(c) is not essentially different from that shown in FIG. 1(b), the leq pieces 8 and 8' of the plate body 2' are removed, and the lower end 8" is formed as a simple linear side.

The steps of fixing the molding at the window with the above described holding body 1 and the press-fitting support 2 will be described.

The long holding body 1 is so cut as to become substantially the same length as the width and the height of the window. An adhesive layer formed on one side of the double coated tape 11 is separately prepared and bonded to the lower surface of a stepped portion of the bonding stationary seat 3' at higher position than the molding fixing seat 3" of the stationary seat 3 of the holding body 1 over the entire longitudinal length.

Then, liner 11' bonded on one side of the double coated tape 11 is removed from the double coated tape 11. As shown in FIG. 3, the adhesive layer of the double coated tape 11 is bonded to the flat rising part B' of the cut cross-sectional part B of the window at the body panel A of a vehicle. Thus, the holding body 1 is fixedly bonded or held to the entire periphery of the cut cross-sectional part B of the body panel A.

Subsequently, the window D to which an adhesive C is bonded to the entire peripheral end thereof is fixedly bonded by pressing to the rising part B" of the cross-sectional part B of the body panel A.

It is noted that, when the window glass D is thus mounted, an air gap 13 is formed between the outer peripheral edge D' of the glass D and the holding part 4 of the holding body 1 secured to the body panel A as indicated in FIG. 3.

A separately prepared molding 12 has an upper bent part 12' formed at the upper end thereof and a lower bent part 12" formed at the lower end thereof. The press-fitting support 2 is so press-fitted into the molding 12 integrally with the molding 12 that the elastic arm pieces 7 and 7' are engaged with the upper bent part 12' of the molding 12 and the pressing leg pieces 8 and 8' are engaged with the lower bent part 12" of the molding 12 in case of FIG. 1(b) and the lower end 8" is engaged with the lower bent part 12" of the molding 12 in case of FIG. 1(c).

Since the elastic arm pieces 7 and 7' of the press-fitting support 2 can be elastically deformed in this case, the support 2 associated thus within the molding 12 of C shape at the end face is interposed between the upper bent part 12' and the lower bent part 12" of the molding 12 in such a manner that the molding 12 can move longitudinally, and the support 2 can be set at an arbitrary position.

When a plurality of required press-fitting supports 2 are set at predetermined intervals within the molding 12 in this manner, the holding arm 9 of the support 2 is press-fitted into the holding gap 5 of the holding body 1 thus bonded to the flat rising part B' of the body panel A. Thus, the engaging part 6 of the holding body 1 is engaged with the engaging part 10 of the holding arm 9 by means of the elastic property of the holding arm 9 and the holding part 4 of the holding body 1, and the support 2 is coupled with the holding body 1. At this time, the upper bent part 12' of the molding 12 is brought into contact with the surface of the window glass D, and the lower bent part 12" of the molding 12 is placed in contact on the molding fixing part 3" of the holding body 1. Thus, the molding 12 can be completely fixed.

It should be appreciated from the foregoing description that since the molding holder thus exemplified according to the present invention comprises a rustproof holding body 1 bonded to the flat rising part B' of the cut cross-sectional part B of a body panel A of a vehicle, a rustproof press-fitting support 2 engaged within a molding 12 fixedly secured to the outside of a window glass D fixedly secured through an adhesive C to the rising part B" of the cut cross-sectional part B, the rustproof holding body 1 having a thickness of a size that an air gap 13 is formed between the outer peripheral end D' of the window glass D thus secured and the rustproof holding body 1 thus secured, and a holding arm 9 projected from the support 2 and inserted into the holding gap 5 between the stationary seat 3 of the holding body 1 and the holding part 4 integrally folded with the seat 3 to engage the engaging part 10 of the holding arm 9 with the engaging part 6 of the holding body 1, the molding holder can be constructed only with two main members of the holding body 1 and the press-fitting support 2 made of rustproof plastic material or the like to be prepared inexpensively, and the molding 12 can be fixedly secured extremely efficiently and easily by engaging the press-fitting support 2 with the molding 12, bonding the holding body 1 to the flat rising part B and inserting the press-fitting support 2 into the holding body 1.

It should be appreciated that since in the present invention the thickness of the holding body 1 is designed to form the air gap 13, not only can the window glass D be easily mounted, but the molding 12 can be removed at the time of various repairs. When the molding 12 is raised in FIG. 3, it is possible to upwardly bend the holding part 4 of the holding body 1 by the holding arm 9 of the pressfitting support 2 with the result that the holding gap 5 can be widened, the pressfitting support 2 can be easily removed from the holding body 1, and the molding 12 can be readily removed.

Therefore, the molding holder of the present invention can provide preferable workability in repairs and eliminate the damage of the holding body 1 and the window glass D.

It should also be understood that since all the members of the molding holder of the present invention can be formed of rustproof material, the molding holder can eliminate the defects due to rust. Further since external force against the molding 12 is not transmitted directly to the holding body 1, the molding body is not forced upwardly by the molding 12 and the holding body provides a firm mounting. The molding body can also be mounted of the window of the vehicle without any welding steps.

What is claimed is:

1. For use with a vehicle having a body panel with a window opening and a window glass mounted in said opening, said opening having a ledge and a portion projecting inwardly of said opening, said window glass being secured by adhesive to said inwardly projecting portion, a molding, and a molding holder comprising:

a rustproof holding body adapted to be bonded to said ledge of said body panel, said holding body having a seat portion adapted to be affixed to said ledge and a holding part apaced from said seat portion and resiliently biased toward said seat portion, said seat portion and said holding part defining a holding gap therebetween, a rustproof press-fitting supporting member engaged within said molding, said supporting member comprising a holding arm, said holding arm being slidably received in said holding gap and being held therein by said resilient bias of said holding part against said seat portion, said holding arm including an engaging part and said holding body having a recess receiving said engaging part, said engaging part being held in said recess by said resilient bias, and wherein said holding body has a thickness of a size and is adapted to be positioned such that an air gap is formed between the outer peripheral edge of the window glass and said holding body, wherein said press-fitting supporting member comprises a pair of elastic arm pieces projecting obliquely upwardly from both upper corners of the plate body thereof.

2. For use with a vehicle having a body panel with a window opening and a window glass mounted in said opening, said opening having a ledge and a portion projecting inwardly of said opening, said window glass being secured by adhesive to said inwardly projecting portion, a molding, and a molding holder comprising:

a rustproof holding body adapted to be bonded to said ledge of said body panel, said holding body having a seat portion adapted to be affixed to said ledge and a holding part spaced from said seat portion and resiliently biased toward said seat portion, said seat portion and said holding part defining a holding gap therebetween, a rustproof press-fitting supporting member engaged within said molding, said supporting member comprising a holding arm, said holding arm being slidably received in said holding gap and being held therein by said resilient bias of said holding part against said seat portion, said holding arm including an engaging part and said holding body having a recess receiving said engaging part, said engaging part being held in said recess by said resilient bias, and wherein said holding body has a thickness of a size and is adapted to be positioned such that an air gap is formed between the outer peripheral edge of the window glass and said holding body, wherein said press-fitting supporting member comprises a pair of elastic arm pieces projecting obliquely upwardly outwardly from both upper corners of the plate body thereof, and a pair of pressing leg pieces projecting obliquely downwardly outwardly from both lower corners of the plate body thereof.

3. In combination:

a vehicle having a body panel with a window opening, said window opening having a ledge and a portion projecting inwardly of said opening from said ledge;

a window glass secured by adhesive to said inwardly projecting portion;

a molding; and a molding holder comprising:

a rustproof holding body bonded to said ledge of said body panel, said holding body having a seat portion affixed to said ledge and said seat portion and said holding part defining a holding gap therebetween, a rustproof press-fitting supporting member engaged within said molding, said supporting member comprising a holding arm, said holding arm being slidably received in said holding gap and being held therein by said resilient bias of said holding part against said seat portion, said holding arm including an engaging part and said holding body having a recess receiving said engaging part, said engaging part being held in said recess by said resilient bias, and wherein said holding body has a thickness of a size that an air gap is formed between the outer peripheral edge of the window glass and said holding body, wherein said press-fitting supporting member comprises a pair of elastic arm pieces projecting obliquely upwardly from both upper corners of the plate body thereof.

* * * * *